(12) United States Patent
Xiong et al.

(10) Patent No.: US 11,590,655 B2
(45) Date of Patent: Feb. 28, 2023

(54) EXTERNAL PARAMETER CALIBRATION METHOD FOR ROBOT SENSORS AND APPARATUS AND ROBOT WITH THE SAME

(71) Applicant: UBTECH ROBOTICS CORP LTD, Shenzhen (CN)

(72) Inventors: Youjun Xiong, Shenzhen (CN); Xu Hu, Shenzhen (CN); Peng Nie, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 507 days.

(21) Appl. No.: 16/611,475

(22) PCT Filed: Dec. 26, 2018

(86) PCT No.: PCT/CN2018/123793
§ 371 (c)(1),
(2) Date: Nov. 6, 2019

(87) PCT Pub. No.: WO2020/132924
PCT Pub. Date: Jul. 2, 2020

(65) Prior Publication Data
US 2021/0354299 A1    Nov. 18, 2021

(30) Foreign Application Priority Data

Dec. 25, 2018 (CN) .......................... 201811594120.3

(51) Int. Cl.
*B25J 9/16* (2006.01)
*B25J 13/08* (2006.01)
(Continued)

(52) U.S. Cl.
CPC .......... *B25J 9/1692* (2013.01); *B25J 9/1653* (2013.01); *B25J 9/1697* (2013.01); *B25J 13/089* (2013.01);
(Continued)

(58) Field of Classification Search
CPC ...... B25J 9/1692; B25J 9/1653; B25J 9/1697; B25J 13/089; G01B 21/04; G01B 9/0207; G01B 11/002
See application file for complete search history.

(56) References Cited

U.S. PATENT DOCUMENTS

2004/0141187 A1* 7/2004 Johnston .............. G01B 21/042
356/608
2006/0023938 A1* 2/2006 Ban ........................ B25J 9/1692
382/153

(Continued)

FOREIGN PATENT DOCUMENTS

CN    101882313 A    11/2010
CN    101882313 B *  12/2011
(Continued)

OTHER PUBLICATIONS

Liu et al., Calibration method of correlation between single line laser radar and CCD (Charge Coupled Device) camera, 2011, CN101882313B, English Translation downloaded from Espacenet on Nov. 16, 2021 (Year: 2011).*

(Continued)

*Primary Examiner* — Alexander Satanovsky
*Assistant Examiner* — Lyudmila Zaykova-Feldman

(57) ABSTRACT

The present disclosure provides an external parameter calibration method for robot sensors as well as an apparatus, robot and storage medium with the same. The method includes: obtaining first sensor data and second sensor data obtained through a first sensor and a second sensor of the robot by collecting position information of a calibration reference object and converting to a same coordinate system to obtain corresponding first converted sensor data and second converted sensor data, thereby determining a first coordinate and a second coordinate of a reference point of the calibration reference object; using the first coordinate (Continued)

and the second coordinate are as a set of coordinate data; repeating the above-mentioned steps to obtain N sets of the coordinate data to calculate the external parameter between the first sensor and the second sensor in response to a relative positional relationship between the robot and the calibration reference object being changed.

17 Claims, 8 Drawing Sheets

(51) Int. Cl.
    *G01B 21/04*     (2006.01)
    *G01B 9/02055*     (2022.01)
    *G01B 11/00*     (2006.01)

(52) U.S. Cl.
    CPC ............ *G01B 21/04* (2013.01); *G01B 9/0207* (2013.01); *G01B 11/002* (2013.01)

(56) References Cited

U.S. PATENT DOCUMENTS

| | | | |
|---|---|---|---|
| 2009/0164044 A1* | 6/2009 | Han | G01S 5/0036 901/46 |
| 2011/0046782 A1* | 2/2011 | Fixell | B25J 9/1692 700/251 |
| 2012/0197438 A1* | 8/2012 | Ogami | B25J 9/1682 901/46 |
| 2012/0229620 A1* | 9/2012 | Ikeda | B25J 9/1697 348/94 |
| 2014/0067317 A1* | 3/2014 | Kobayashi | B25J 9/1697 702/153 |
| 2016/0070265 A1* | 3/2016 | Liu | G05D 1/0088 701/25 |
| 2016/0346932 A1* | 12/2016 | Deng | B25J 9/1692 |
| 2018/0283842 A1* | 10/2018 | Rueb | G01B 7/012 |
| 2019/0253600 A1* | 8/2019 | Oshima | H04N 5/2353 |
| 2019/0265324 A1* | 8/2019 | Bilbao De Mendizabal | G01R 33/0023 |
| 2020/0156252 A1* | 5/2020 | Ko | B25J 9/161 |
| 2020/0164512 A1* | 5/2020 | Ooba | G05B 19/4086 |
| 2021/0146942 A1* | 5/2021 | Hrabe | H04N 13/246 |

FOREIGN PATENT DOCUMENTS

| | | | |
|---|---|---|---|
| CN | 105758426 A | | 7/2016 |
| CN | 105758426 B | * | 7/2019 ............. G01C 25/00 |

OTHER PUBLICATIONS

Liu et al., Calibration method of correlation between single line laser radar and CCD (Charged Coupled Device) camera, 2011, CN101882313B, English translation downloaded from Espacenet on Nov. 16, 2021 (Year: 2021).*
Multi-sensor joint calibration method of mobile robot, 2019, CN105758426B, English Translation downloaded from Espacenet on Nov. 16, 2021 (Year: 2019).*
Liu et al., Calibration method of correlation between single line laser radar and CCD (Charged Coupled Device) camera, 2011, CN101882313B, English translation downloaded from Espacenet on Nov. 16, 2021 (Year: 2021) (Year: 2021).*
Multi-sensor joint calibration method of mobile robot, 2019,CN105758426B, English translation downloaded from Espacenet on Nov. 16, 2021 (Year: 2019) (Year: 2019).*
ISR for PCT/CN2018/123793.
Written opinions of ISA for PCT/CN2018/123793.

* cited by examiner

EXTERNAL PARAMETER CALIBRATION METHOD FOR ROBOT SENSORS AND APPARATUS AND ROBOT WITH THE SAME

BACKGROUND

1. Technical Field

The present disclosure relates to computer processing technology, and particularly to an external parameter calibration method for robot sensors as well as an apparatus, robot and storage medium with the same.

2. Description of Related Art

The system of a robot usually needs to work with data from a variety of sensors. However, since the sensors have differences in their sensing characteristics and are placed at different positions on the body of the robot, each of the sensors is different in its sensing performance with respect to environmental information. When the system of the robot using the data of the sensors, the data is better to be converted to have a unified description manner.

Although there will be a design for the positions of all the sensors of the robot when designing the structure of the robot, the actual position of the sensor usually has a certain error with respect to the design due to the workpiece machining error, the assembly error, and the error of the sensor itself. Hence, when the data of the sensors is converted to the same coordinate system, them will have positional deviations between the data of the sensors which map the same object in the scene to different positions. The deviations will cause the sensing error of the robot with respect to the environment and affect the performance of the robot.

SUMMARY

Based on this, it is necessary to provide an external parameter calibration method for robot sensors as well as an apparatus, robot and storage medium with the same which can reduce the deviation and improve the performance of a robot.

In a first aspect, an embodiment of the present disclosure provides an external parameter calibration method for sensors of a robot. The method includes:

obtaining first sensor data and second sensor data obtained through a first sensor and a second sensor of the robot by collecting position information of a calibration reference object;

converting the first sensor data and the second sensor data to a same coordinate system to obtain corresponding first converted sensor data and second converted sensor data;

determining a first coordinate of a reference point of the calibration reference object based on the first converted sensor data, determining a second coordinate of the reference point of the calibration reference object based on the second convened sensor data, and using the first coordinate and the second coordinate as a set of coordinate data;

returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter, and calculating the external parameter between the first sensor and the second sensor based on the N sets of the coordinate data, where the external parameter is a relative positional relationship parameter between the first sensor and the second sensor.

In a second aspect, an embodiment of the present disclosure provides an external parameter calibration apparatus for sensors of a robot. The apparatus includes:

an obtaining module configured to obtain first sensor data and second sensor data obtained through a first sensor and a second sensor of the robot by collecting position information of a calibration reference object;

a conversion module configured to convert the first sensor data and the second sensor data to a same coordinate system to obtain corresponding first converted sensor data and second converted sensor data;

a determination module configured to determine a first coordinate of a reference point of the calibration reference object based on the first converted sensor data, determine a second coordinate of the reference point of the calibration reference object based on the second converted sensor data, and use the first coordinate and the second coordinate as a set of coordinate data;

a loop module configured to return to the obtain the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and a calculation module configured to calculate the external parameter between the first sensor and the second sensor based on the N sets of the coordinate data, where the external parameter is a relative positional relationship parameter between the first sensor and the second sensor.

In a third aspect, an embodiment of the present disclosure provides a robot including a storage and a processor. The memory stores a computer program, and the processor is caused to execute the following steps when the computer program is executed by the processor:

obtaining first sensor data and second sensor data obtained through a first sensor and a second sensor of the robot by collecting position information of a calibration reference object;

converting the first sensor data and the second sensor data to a same coordinate system to obtain corresponding first converted sensor data and second converted sensor data;

determining a first coordinate of a reference point of the calibration reference object based on the first converted sensor data, determining a second coordinate of the reference point of the calibration reference object based on the second converted sensor data, and using the first coordinate and the second coordinate as a set of coordinate data;

returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and calculating the external parameter between the first sensor and the second sensor based on the N sets of the coordinate data, where the external parameter is a relative positional relationship parameter between the first sensor and the second sensor.

In a fourth aspect, an embodiment of the present disclosure provides a computer readable storage medium storing with a computer program. A processor is caused to execute the following steps when the computer program is executed by the processor:

obtaining first sensor data and second sensor data obtained through a first sensor and a second sensor of the robot by collecting position information of a calibration reference object;

converting the first sensor data and the second sensor data to a same coordinate system to obtain corresponding first converted sensor data and second converted sensor data;

determining a first coordinate of a reference point of the calibration reference object based on the first converted sensor data, determining a second coordinate of the reference point of the calibration reference object based on the second converted sensor data, and using the first coordinate and the second coordinate as a set of coordinate data;

returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and calculating the external parameter between the first sensor and the second sensor based on the N sets of the coordinate data, where the external parameter is a relative positional relationship parameter between the first sensor and the second sensor.

In the above-mentioned external parameter calibration method for robot sensors as well as the apparatus, robot and storage medium with the same, the position information of the calibration reference object is collected through the first sensor and the second sensor in the robot to obtain the first sensor data and the second sensor data to convert to the same coordinate system so as to obtain the first converted sensor data and the second converted sensor data, the first coordinate of the reference point of the calibration reference object is obtained based on the first converted sensor data and the second coordinate of the reference point of the calibration reference object is obtained based on the second converted sensor data, the first coordinate and the second coordinate are used as a set of the coordinate data, and the N sets of the coordinate data are collected by changing the relative positional relationship between the robot and the calibration reference object while N is a positive integer not less than an amount of unknown degrees of freedom in the external parameter, and the relative positional relationship parameter between the first sensor and the second sensor is calculated based on the N sets of the coordinate data. The positional relationship parameter of the first sensor and the second sensor can be solved by only moving the calibration reference object to collect the N sets of the coordinate data, which not only simplifies the calibration, but also greatly reduces the deviation to improve the consistency of the first sensor and the second sensor in the coordinate system of the robot, thereby improving the performance of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

In which.

DETAILED DESCRIPTION

In order to make the objectives, the technical solutions, and the advantages of the present disclosure more clearly, the present disclosure will be further described in detail below with reference to the drawings and embodiments. It should be understood that, the specific embodiments described herein are merely for explaining the present disclosure and are not intended to limit the present disclosure.

Figure 1:
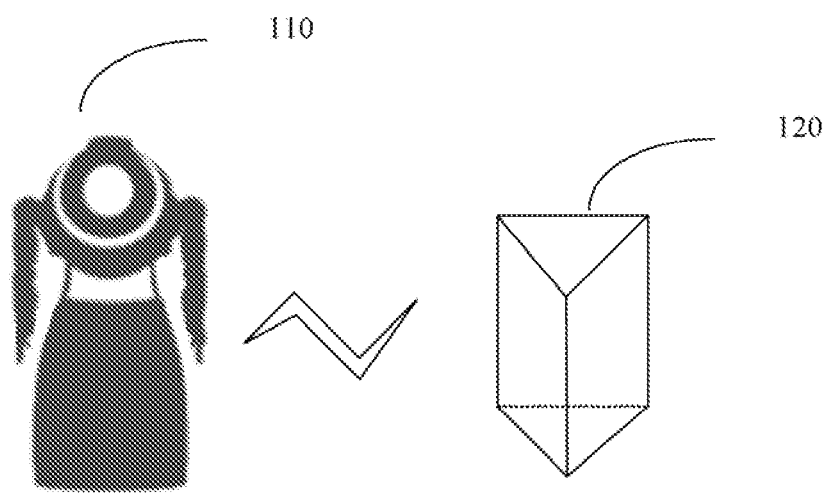
FIG. 1 is a diagram of an application environment of an external parameter calibration method for robot sensors according to an embodiment.

FIG. 1 is a diagram of an application environment of an external parameter calibration method for robot sensors according to an embodiment. Referring to FIG. 1, the external parameter calibration method for robot sensors is applied to an external parameter calibration system for robot sensors. The external parameter calibration system for robot sensors includes a robot 110 and a calibration reference object 120. The robot 110 collects the position of the calibration reference object 120 through a first sensor (e.g., a single-line radar) and a second sensor (e.g., a camera) to obtain first sensor data and second sensor data, and then convert the first sensor data and the first sensor data to a same coordinate system so as to correspondingly obtain the first converted sensor data and the second converted sensor data; determines a first coordinate of a reference point of the calibration reference object based on the first converted sensor data, determines a second coordinate of the reference point of the calibration reference object based on the second converted sensor data, and takes the first coordinate and the second coordinate as a set of coordinate data; moves the calibration reference object 120; repeats the forgoing process until N sets of coordinate data are obtained, where N is a positive integer not less than an amount of unknown degrees of freedom in an external parameter; and finally calculates the external parameter between the first sensor and the second sensor based on the N sets of the coordinate data, where the external parameter is a relative positional relationship parameter between the first sensor and the second sensor.

Figure 2:
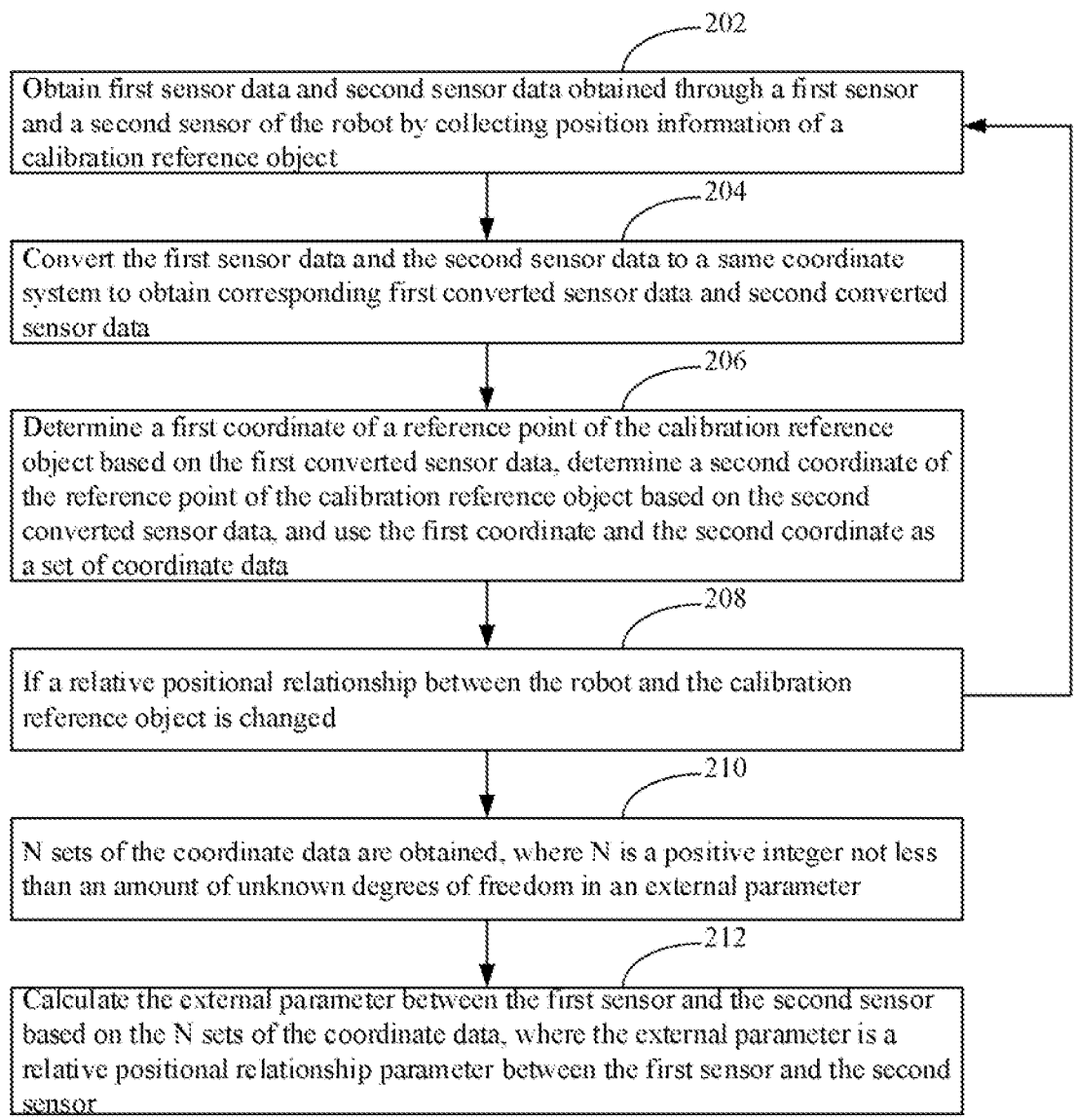
FIG. 2 is a flow chart of an external parameter calibration method for robot sensors according to an embodiment.

As shown in FIG. 2, an external parameter calibration method for robot sensors is provided. The external parameter calibration method for robot sensors is applied to a robot, and specifically includes the steps as follows.

Step 202: obtaining first sensor data and second sensor data obtained through a first sensor and a second sensor of the robot by collecting position information of a calibration reference object.

In which, the first sensor and the second sensor are two different sensors in the robot. In one embodiment, the first sensor can be a radar and the second sensor can be a visual sensor (e.g., camera). Both the first sensor and the second sensor can be used to collect positional information of the calibration reference object. The calibration reference object refers to a reference object for assisting the calibration, and the first sensor data and the second sensor data are the positions of a series of points obtained by detection. In order to be able to clearly determine a certain point, it generally selects an object with a significant turning point to serves as the calibration reference object. In one embodiment, a triangular cylinder may be adopted as the calibration reference object, where the triangular cylinder includes an included angle, and the apex of the included angle is a distinct turning point, so that the position of the turning point can be quickly determined later. Of course, other objects with distinct turning points such as triangular cones or cubes can also be used.

The first sensor and the second sensor collect the positions of the same calibration reference object at the same position, so as to obtain the first sensor data and the second sensor data, respectively. It is for the convenience of calibrating the external parameter based on the difference between the first sensor data and the second sensor data. The external parameter is the parameter of the exterior, which refers to the relative positional relationship between the sensors.

In a practical application scenario, the robot and the calibration reference object are placed on the same ground with a relatively good flatness, the robot is kept stationary, and the calibration reference object is placed directly in front of the robot. The calibration reference object is measured through the first sensor and the second sensor to obtain the first sensor data and the second sensor data. For the selection of the distance between the calibration reference object and the robot, the distance range and the area range in which the first sensor and the second sensor have relatively good measurement accuracy can be selected. If the first sensor is a radar and the second sensor is a camera, since the closer the measurement distance is, the higher the accuracy is, it is better to choose a small distance range such as 0.3 m-2.0 m. For the camera, since there will be a deformation at the side of the vision field of the camera, the middle part of the vision field can be selected as the area range.

Step 204: converting the first sensor data and the second sensor data to a same coordinate system to obtain corresponding first converted sensor data and second converted sensor data.

In which, since the first sensor data collected by the first sensor is data in the coordinate system of the first sensor, while the second sensor data collected by the second sensor is data in the coordinate system of the second sensor, in order to facilitate comparison between the two, it needs to convert them to the same coordinate system. In one embodiment, the first sensor data and the second sensor data can be uniformly converted to the coordinate system of the first sensor or the coordinate system of the second sensor so that both are in the same coordinate system and to obtain the first converted sensor data and the second converted sensor data. In another embodiment, the first sensor data and the second sensor data are respectively converted to the coordinate system of the robot to obtain the first converted sensor data and the second converted sensor data, respectively. In one embodiment, the coordinate system of the robot is XOY, where the X axis is directly in front of the robot, the Y axis is at the left side of the robot and perpendicular to the X axis, and XOY is parallel to the ground.

Step 206: determining a first coordinate of a reference point of the calibration reference object based on the first converted sensor data, and determining a second coordinate of the reference point of the calibration reference object based on the second converted sensor data, and using the first coordinate and the second coordinate as a set of coordinate data.

Figure 3:
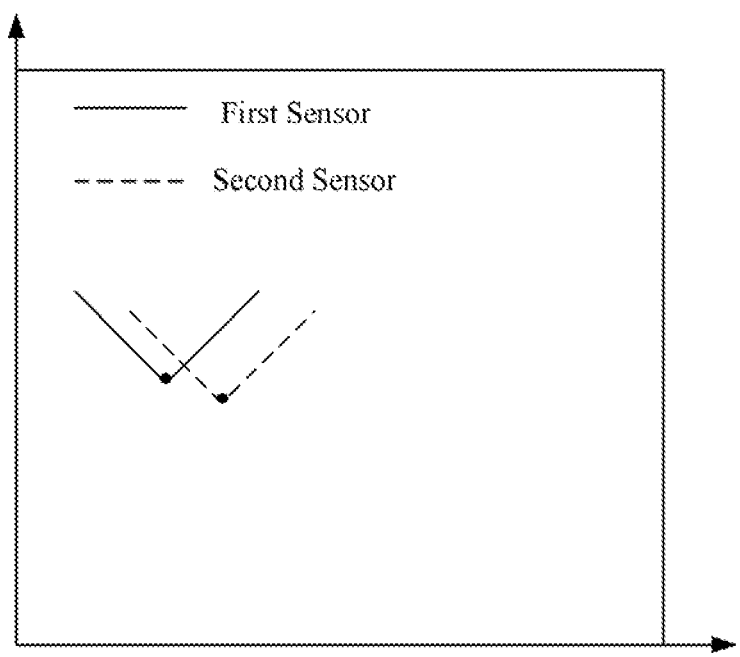
FIG. 3 is a schematic diagram of determining a first and second coordinates of a reference point according to an embodiment.

In which, the reference point refers to a point of the calibration reference object that is for reference calculation. The reference point generally uses the point that is easily recognized and distinguished. For example, for a triangular cylinder, the data curve obtained by projection is a triangle, and the apex of the triangle is the most easily recognized point, so the apex of the included angle in the triangular cylinder can be used as the reference point. The first coordinate of the reference point is determined based on the first converted sensor data, and the second coordinate of the reference point is determined based on the second converted sensor data. As shown in FIG. 3, it is a schematic diagram of determining a first coordinate and a second coordinate of a reference point according to an embodiment. As can be seen from the figure, the coordinates of the reference point that are determined by the two have a certain error, and the black point is the determined coordinate of the reference point. In a two-dimensional plan view, the recorded first coordinate is $(x_0, y_0)$ and the recorded second coordinate is $(x_0', y_0')$. The first coordinate and the second coordinate correspond to the coordinates of the same reference point, and the first coordinate and the second coordinate constitute a set of coordinate data.

Step 208: returning to step 202 to loop sequentially in the case that a relative positional relationship between the robot and the calibration reference object is changed until step 210 is achieved.

Step 210: N sets of the coordinate data am obtained, where N is a positive integer not less than an amount of unknown degrees of freedom in an external parameter.

In which, by changing the relative positional relationship between the robot and the calibration reference object and repeating the above-mentioned steps to obtain another set of coordinate data, and so on, until the N sets of the coordinate data are obtained, where the value of N is determined based on the amount of unknown degrees of freedom included in the external parameter. N should be a positive integer not less than the amount of unknown degrees of freedom, for example, for a three-dimensional space, which includes 6 degrees of freedom [x, y, z, roll, pitch, yaw], where "roll" represents rotating around the z axis, "pitch" represents rotating about the x-axis, and "yaw" represents rotating about the y-axis. Then, N should be greater than or equal to 6. For a 2D navigation application of the robot, the z-axis is ignored, the x-axis is directly in front of the robot, and the y-axis is the left side of the robot which is perpendicular to the x-axis, and xoy is parallel to the ground, so the degree of freedom of the external parameter is simplified to 3 degrees of freedom [x, y, yaw], then N should be greater than or equal to 3.

Step 212: calculating the external parameter between the first sensor and the second sensor based on the N sets of the coordinate data, where the external parameter is a relative positional relationship parameter between the first sensor and the second sensor.

In which, the external parameter is the parameter of the exterior, which refers to the relative positional relationship between the sensors. In the case that the N sets of the coordinate data corresponding to the first sensor and the second sensor is known, the external parameter between the first sensor and the second sensor is calculated by obtaining a conversion relationship between the first sensor and the second sensor. In one embodiment, the relative positional relationship between the first sensor and the second sensor can be calculated using least squares. For a 2D navigation application of the robot of the robot, since there are three unknown degrees of freedom, the corresponding values of the three degrees of freedom can be calculated when there are at least 3 sets of coordinate data, thereby obtaining a parameter of the relative positional relationship between the first sensor and the second sensor.

Figure 4:
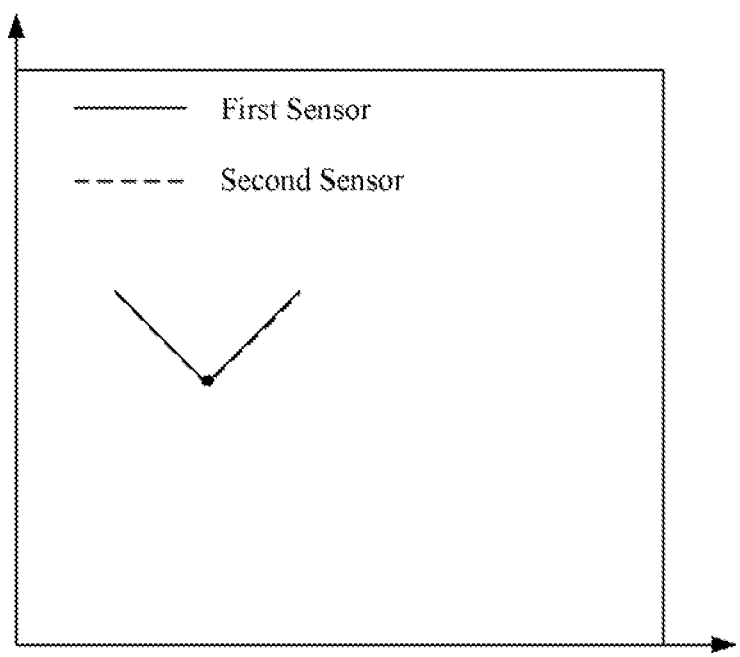
FIG. 4 is a schematic diagram of mapping an external parameter to a coordinate system of the robot after obtaining the external parameter according to an embodiment.

In one embodiment, after obtaining the external parameter between the first sensor and the second sensor, a model of the robot is constructed based on the obtained external parameter. As shown in FIG. 4, in the result of mapping the first sensor data and the second sensor data onto the coordinate system of the robot, the consistency of the first sensor and the second sensor in the coordinate system of the robot is improved. By using the above-mentioned external parameter calibration method for robot sensors, the former external parameters of the sensor can be solved by only moving the calibration reference object to collect several sets of the data of the calibration reference object. The obtained calibration result is accurate, which greatly improves the consistency of the external description of different sensors.

In the above-mentioned external parameter calibration method for robot sensors, the position information of the calibration reference object is collected through the first sensor and the second sensor in the robot to obtain the first sensor data and the second sensor data to convert the two data to the same coordinate system so as to obtain the first converted sensor data and the second converted sensor data, the first coordinate of the reference point of the calibration reference object is obtained based on the first converted sensor data and the second coordinate of the reference point of the calibration reference object is obtained based on the second convened sensor data, the first coordinate and the second coordinate are used as a set of the coordinate data, and the N sets of the coordinate data are collected by changing the relative positional relationship between the robot and the calibration reference object while N is a positive integer not less than an amount of unknown degrees of freedom in the external parameter, and the relative positional relationship parameter between the first sensor and the second sensor is calculated based on the N sets of the coordinate data. The positional relationship parameter of the first sensor and the second sensor can be solved by only moving the calibration reference object to collect the N sets of the coordinate data, which not only simplifies the calibration, but also greatly reduces the deviation to improve the consistency of the first sensor and the second sensor in the coordinate system of the robot, thereby improving the performance of the robot.

In one embodiment, the reference point is a turning point of two associated sides of the calibration reference object. The determining the first coordinate of the reference point of the calibration reference object based on the first converted sensor data, and determining the second coordinate of the reference point of the calibration reference object based on the second converted sensor data includes: fitting the two associated sides with respect to the turning point of the collected calibration reference object based on the first converted sensor data, and determining the first coordinate of the turning point based on a result of the fitting; and fitting the two associated sides with respect to the turning point of the collected calibration reference object based on the second converted sensor data, and determining the second coordinate of the turning point based on a result of the fitting.

Figure 5:
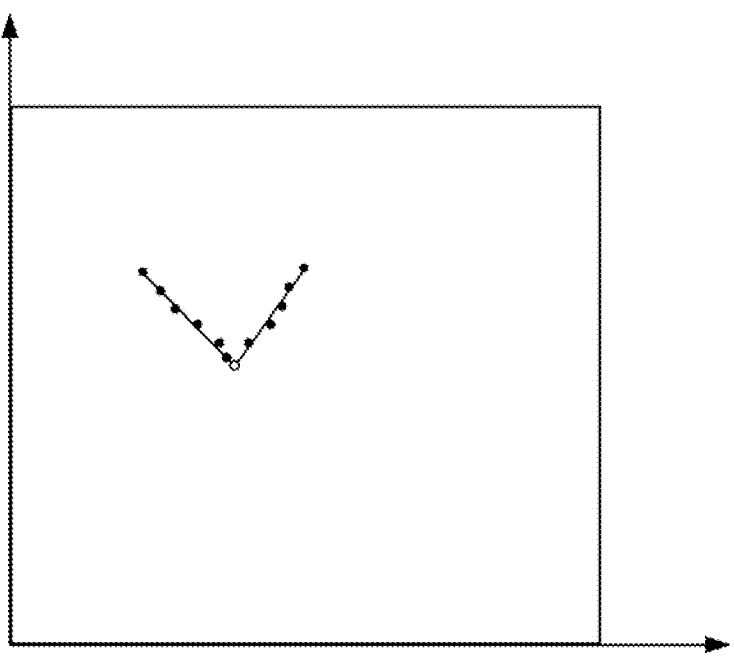
FIG. 5 is a schematic diagram of determining the position of a reference point by fitting two triangle sides according to an embodiment.

In which, since the resolution of different sensors may be inconsistent, there will be a large data error while the position of the turning point of the calibration reference object is directly measured. In this embodiment, it is proposed to perform corresponding line fitting on the two associated sides with respect to the turning point, and then the position of the intersection of the two sides after the fitting is used as the position of the turning point. As shown in FIG. 5, in one embodiment, the calibration reference object is a triangular cylinder, and the turning point is an apex corresponding to the included angle of the triangular cylinder. It can be seen from the figure that the apex is associated with two triangle sides, and the data collected by the sensor is composed of a plurality of points, hence a corresponding straight line fitting is needed. By fitting the two triangle sides, the position of the intersection (i.e., the hollow circle in the figure) of the two triangle sides is calculated, so that the positioning can be accurately performed.

In one embodiment, the two associated sides with respect to the turning point of the calibration reference object are straight lines. The performing the fitting on the two associated sides with respect to the turning point of the collected calibration reference object based on the first converted sensor data, and determining the first coordinate of the turning point based on the result of the fitting includes: performing a straight line fitting on each of the two associated sides with respect to the turning point of the collected calibration reference object based on the first converted sensor data, and using a coordinate of an intersection point of two straight lines obtained by the fitting as the first coordinate of the turning point; the performing the fitting on the two associated sides with respect to the turning point of the collected calibration reference object based on the second converted sensor data, and determining the second coordinate of the turning point based on the result of the fitting includes: performing a straight line fitting on each of the two associated sides with respect to the turning point of the collected calibration reference object based on the second converted sensor data, and using a coordinate of an intersection point of two straight lines obtained by the fitting as the second coordinate of the turning point.

In which, since the two associated sides with respect to the turning point of the calibration reference object are straight lines, when calculating the coordinate of the turning point, the line fitting can be performed on the two associated sides first, and then the coordinate of the intersection of the two straight lines obtained by the fitting can be used as the coordinate of the turning point. In such a manner, the problem of inaccurate measurement of the coordinate of the turning point due to the resolution problem can be avoided, which improves the accuracy of the measurement of the coordinate.

In one embodiment, the converting the first sensor data and the second sensor data to the same coordinate system to obtain the corresponding first converted sensor data and the second converted sensor data includes: converting the first sensor data from a coordinate system of the first sensor to a coordinate system of the robot to obtain first converted sensor data; and converting the second sensor data from a coordinate system of the second sensor to the coordinate system of the robot to obtain second converted sensor data.

In which, in order to convert the first sensor data and the second sensor data to the same coordinate system, the first sensor data is converted from the coordinate system of the first sensor to the coordinate system of the robot and the second sensor data is converted from the coordinate system of the second sensor to the coordinate system of the robot. Since there will be a design for the position of all the sensors of the robot when designing the structure of the robot, a conversion relationship between the coordinate system of the sensor and the coordinate system of the robot can be obtained to perform the conversion of the coordinate based on the conversion relationship of the coordinate systems.

In one embodiment, the calculating the external parameter between the first sensor and the second sensor based on the N sets of the coordinate data, where the external parameter is the relative positional relationship parameter between the first sensor and the second sensor includes: obtaining a conversion relationship between positions of the first sensor and the second sensor, and calculating the relative positional relationship parameter between the first sensor and the second sensor based on the N sets of the coordinate data and the conversion relationship.

In which, the conversion relationship between the position of the first sensor and that of the second sensor can be represented by a parameter to be solved. In one embodiment, it assumes that the data set of the first sensor is $(x_i, y_i)$ and the data set of the second sensor is $(x_i', y_i')$, and for the 2D navigation application of the robot, the parameter to be solved is $(\Delta x, \Delta y, \Delta yaw)$. Specifically, the conversion relationship of the positions of the first sensor and the second sensor can be expressed as follows:

$$\begin{bmatrix} x_i \\ y_i \\ 1 \end{bmatrix} = \begin{bmatrix} \cos(\Delta yaw) & \sin(\Delta yaw) & \Delta x \\ -\sin(\Delta yaw) & \cos(\Delta yaw) & \Delta y \\ 0 & 0 & 1 \end{bmatrix} \begin{bmatrix} x_i' \\ y_i' \\ 1 \end{bmatrix};$$

the matrix equation is solved to obtain:

$$\begin{bmatrix} x_i \\ y_i \\ 1 \end{bmatrix} = \begin{bmatrix} x_i' \cos(\Delta yaw) + y_i' * \sin(\Delta yaw) + \Delta x \\ -x_i' \sin(\Delta yaw) + y_i' * \cos(\Delta yaw) + \Delta y \\ 1 \end{bmatrix};$$

further converted to obtain:

$$\begin{bmatrix} x_i \\ y_i \\ 1 \end{bmatrix} = \begin{bmatrix} x_i' & y_i' & 1 & 0 \\ y_i' & -x_i' & 0 & 1 \end{bmatrix} \begin{bmatrix} \cos(\Delta yaw) \\ \sin(\Delta yaw) \\ \Delta x \\ \Delta y \end{bmatrix};$$

therefore, the problem can be described as a problem of solving a linear equation of $Ax=b$:

$$A = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4}; b = \begin{bmatrix} x_0 \\ y_0 \\ \vdots \\ x_n \\ y_n \end{bmatrix}_{2n*1};$$

furthermore, the following formula is obtained:

$$\begin{bmatrix} \cos(\Delta yaw) \\ \sin(\Delta yaw) \\ \Delta x \\ \Delta y \end{bmatrix} = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4}^{-1} \begin{bmatrix} x_0 \\ y_0 \\ \vdots \\ x_n \\ y_n \end{bmatrix}_{2n*1};$$

$$\Delta yaw = \arctan\left(\frac{\sin(\Delta yaw)}{\cos(\Delta yaw)}\right).$$

finally, each value in the external parameter ($\Delta x$, $\Delta y$, $\Delta yaw$) is solved, where n represents n sets of coordinate data.

In one embodiment, the first sensor is a single-line radar and the second sensor is a visual sensor. The obtaining the first sensor data and the second sensor data obtained through the first sensor and the second sensor of the robot by collecting the position information of the calibration reference object includes: obtaining visual sensor data obtained through the visual sensor by collecting the position information of the calibration reference object, and extracting corresponding row data from the visual sensor data to take as the second sensor data based on a measured height of the single-line radar.

In which, in a specific scenario, the first sensor is a single-line radar and the second sensor is a visual sensor. The position obtained by measuring the calibration reference object through the single-line radar is the position of each point on a certain line of the calibration reference object. Since the visual sensor data is larger in coverage, which includes the measured position of each point on a surface, in order to maintain the consistency of the data reference, row data whose height is consistent or close to the single-line radar is selected from the visual sensor data to use as the second sensor data, and the first sensor data and the second sensor data obtained by this manner are one-dimensional data. In another embodiment, if the height of the single-line radar is not within the measurement range of the vision sensor, the one with the closest height is selected as the second sensor data.

In one embodiment, the calibration reference object is a triangular cylinder and the reference point is an apex of an included angle of the triangular cylinder.

In which, in order to improve the accuracy of measurement, an isosceles triangle cylinder is selected as the calibration reference object. In order to improve the accuracy of the measurement of the triangular cylinder, the angle of the isosceles included angle of the isosceles triangle cylinder can be in a range of 90°-160°. In addition, when placed on the ground, the cylinder has higher verticality, which can guarantee that the height of the triangular cylinder can be effectively measured. In one embodiment, if the first sensor is a single-line radar and the second sensor is a camera, the surface of the triangular cylinder is made of a material which has high measurement accuracy for a radar and a camera, for example, wood, white frosted plastic, and the like.

Figure 6:
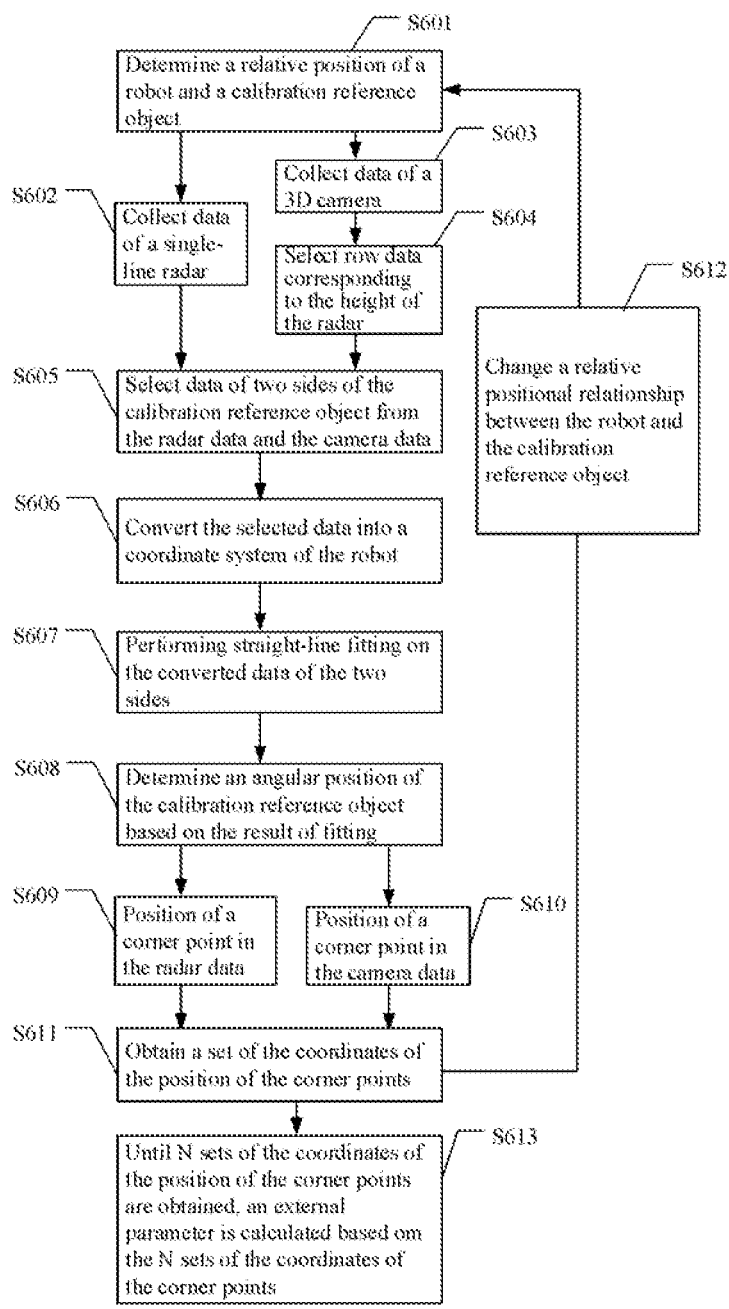
FIG. 6 is a schematic diagram of a process of an external parameter calibration method for robot sensors according to an embodiment.

In one embodiment, the first sensor is a single line radar, the second sensor is a 3D camera, and the calibration reference is a triangular cylinder. As shown in FIG. 6, it is a schematic diagram of a process of an external parameter calibration method for robot sensors. First, in block. S601, the relative position of the robot and the calibration reference object is determined. Then, in blocks S602-S604, the radar data is obtained by the single-line radar, the camera data is obtained by the 3D camera, and the row data corresponding to the height of the radar is selected from the camera data. And then, in blocks S605-S611, the data of the two sides of the calibration reference object are selected from the radar data and the camera data, the selected data is converted into the coordinate system of the robot, a straight-line fitting is performed on the converted data of the two sides, and the angular position of the calibration reference object is determined based on the result of fitting, so as to obtain the position of the corner point in the radar data and the position of the corner point in the camera data, that is, obtaining a set of the coordinates of the position of the corner points. And then in block S612, by changing the relative positional relationship between the robot and the calibration reference object and repeating the above-mentioned process, another set of the coordinates of the position of the corner points are obtained. The above-mentioned steps are sequentially repeated until N sets of the coordinates of the position of the corner points are obtained, and the external parameter is calculated based on the N sets of the coordinates of the corner points, in block S613.

Figure 7:
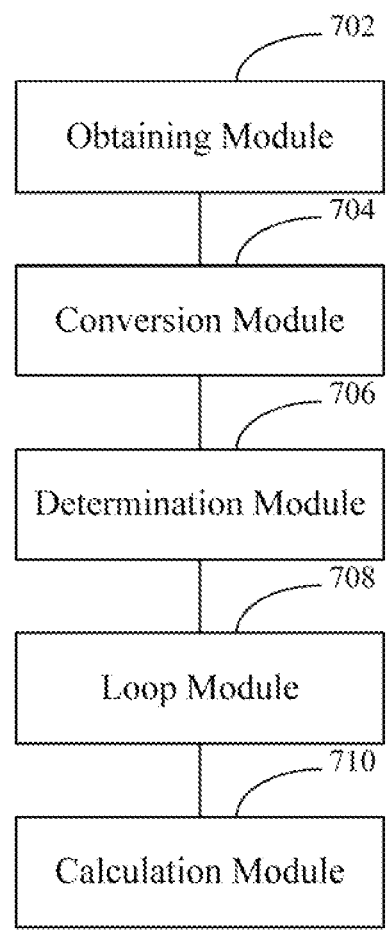
FIG. 7 is a schematic block diagram of an external parameter calibration apparatus for robot sensors according to an embodiment.

As shown in FIG. 7, an external parameter calibration apparatus for sensors of a robot is provided. The apparatus includes:

an obtaining module 702 configured to obtain first sensor data and second sensor data obtained through a first sensor and a second sensor of the robot by collecting position information of a calibration reference object;

a conversion module 704 configured to convert the first sensor data and the second sensor data to a same coordinate system to obtain corresponding first converted sensor data and second converted sensor data;

a determination module 706 configured to determine a first coordinate of a reference point of the calibration reference object based on the first converted sensor data, and determining a second coordinate of the reference point of the calibration reference object based on the second converted sensor data, and using the first coordinate and the second coordinate as a set of coordinate data;

a loop module 708 configured to return to the obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and a calculation module 710 configured to calculate the external parameter between the first sensor and the second sensor based on the N sets of the coordinate data, where the external parameter is a relative positional relationship parameter between the first sensor and the second sensor.

In one embodiment, the reference point is a turning point of two associated sides of the calibration reference object;

the determining module is further configured to fit the two associated sides with respect to the turning point of the collected calibration reference object based on the first converted sensor data, and determine the first coordinate of the turning point based on a result of the fitting; and fit the two associated sides with respect to the turning point of the collected calibration reference object based on the second converted sensor data, and determine the second coordinate of the turning point based on a result of the fitting.

In one embodiment, the two associated sides with respect to the turning point of the calibration reference object are straight lines; the determining module is further configured to perform a straight line fitting on each of the two associated sides with respect to the turning point of the collected calibration reference object based on the first converted sensor data, and use a coordinate of an intersection point of two straight lines obtained by the fitting as the first coordinate of the turning point; and perform a straight line fitting on each of the two associated sides with respect to the turning point of the collected calibration reference object based on the second converted sensor data, and use a coordinate of an intersection point of two straight lines obtained by the fitting as the second coordinate of the turning point.

In one embodiment, the conversion module is further configured to convert the first sensor data from a coordinate system of the first sensor to a coordinate system of the robot to obtain first converted sensor data; and convert the second sensor data from a coordinate system of the second sensor to the coordinate system of the robot to obtain second converted sensor data.

In one embodiment, the calculation module is further configured to obtain a conversion relationship between positions of the first sensor and the second sensor; and calculating the relative positional relationship parameter between the first sensor and the second sensor based on the N sets of the coordinate data and the conversion relationship.

In one embodiment, the first sensor is a single-line radar and the second sensor is a visual sensor, the obtaining module is further configured to obtain visual sensor data obtained through the visual sensor by collecting the position information of the calibration reference object, and extracting corresponding row data from the visual sensor data to take as the second sensor data based on a measured height of the single-line radar.

In one embodiment, the calibration reference object is a triangular cylinder and the reference point is an apex of an included angle of the triangular cylinder.

Figure 8:
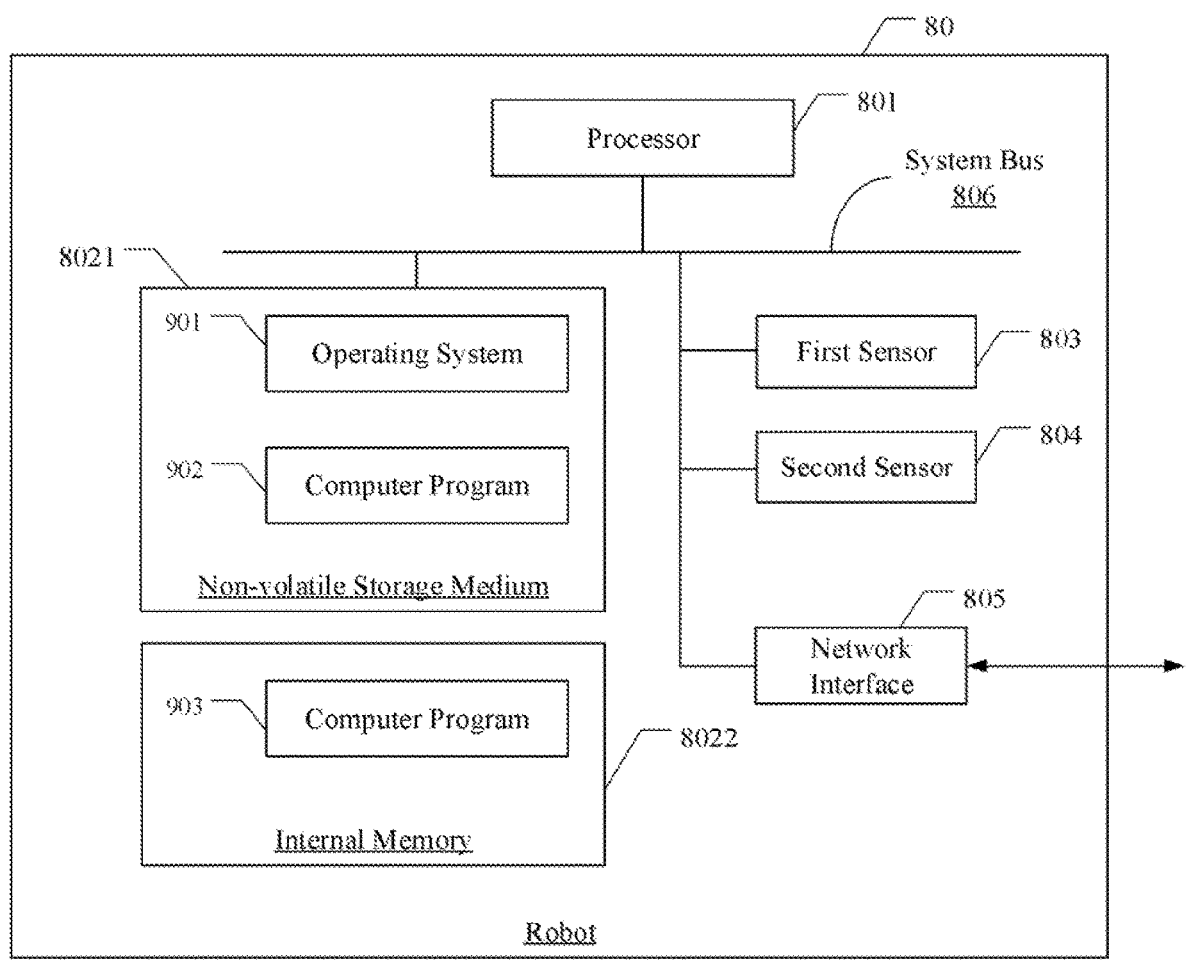
FIG. 8 is a structural diagram of the internal of a robot according to an embodiment.

FIG. 8 is a structural diagram of the internal of a robot according to an embodiment. The computer can be a server. As shown in FIG. 8, the robot 80 includes a processor 801, a storage 802, a first sensor 803, a second sensor 804, and a network interface 805 which are connected through a system bus 806. In which, the storage 802 includes a non-volatile storage medium 8021 and an internal memory 8022. The non-volatile storage medium 8021 of the robot 80 stores an operating system 901, and may also store a computer program 902 which enables the processor to implement the external parameter calibration method for robot sensors when executed by the processor 801. The internal memory 8022 may also store a computer program 903 which enables the processor to perform the external parameter calibration method for robot sensors when executed by the processor 801. The network interface 805 is used to communicate with the exterior. It can be understood by those skilled in the art that, the structure shown in FIG. 8 is only a block diagram of a part of the structure related to the scheme of the present disclosure, and does not constitute a limitation of the robot to which the scheme of the present disclosure is applied. The specific robot may include more or fewer components than shown in the figures, or some components can be combined, or can have different component arrangements.

In one embodiment, the external parameter calibration method for robot sensors provided by the present disclosure can be implemented in the form of a computer program that can be executed on a robot as shown in FIG. 8. The program templates for composing the external parameter calibration apparatus for robot sensors such as the obtaining module 702, the conversion module 704, the determination module 706, the loop module 708, and the calculation module 710 can be stored in the storage of the robot.

A robot including a memory and a processor is provided. The memory stores a computer program, and the processor is caused to execute the following steps when the computer program is executed by the processor: obtaining first sensor data and second sensor data obtained through a first sensor and a second sensor of the robot by collecting position information of a calibration reference object: converting the first sensor data and the second sensor data to a same coordinate system to obtain corresponding first converted sensor data and second converted sensor data; determining a first coordinate of a reference point of the calibration reference object based on the first converted sensor data, and determining a second coordinate of the reference point of the calibration reference object based on the second converted sensor data, and using the first coordinate and the second coordinate as a set of coordinate data; returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and calculating the external parameter between the first sensor and the second sensor based on the N sets of the coordinate data, where the external parameter is a relative positional relationship parameter between the first sensor and the second sensor.

A computer readable storage medium storing with a computer program is provided. A processor is caused to execute the following steps when the computer program is executed by the processor: obtaining first sensor data and second sensor data obtained through a first sensor and a second sensor of the robot by collecting position information of a calibration reference object; converting the first sensor data and the second sensor data to a same coordinate system to obtain corresponding first converted sensor data and second converted sensor data; determining a first coordinate of a reference point of the calibration reference object based on the first converted sensor data, and determining a second coordinate of the reference point of the calibration reference object based on the second converted sensor data, and using the first coordinate and the second coordinate as a set of coordinate data; returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, where N is a positive integer not less than an amount of unknown degrees of freedom in an external parameter; and calculating the external parameter between the first sensor and the second sensor based on the N sets of the coordinate data, where the external parameter is a relative positional relationship parameter between the first sensor and the second sensor.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. An external parameter calibration method for sensors of a robot, comprising:
   obtaining first sensor data and second sensor data obtained through a first sensor and a second sensor of the robot by collecting position information of a calibration reference object;
   converting the first sensor data and the second sensor data to a same coordinate system to obtain corresponding first converted sensor data and second converted sensor data;
   determining a first coordinate of a reference point of the calibration reference object based on the first converted sensor data, and determining a second coordinate of the reference point of the calibration reference object based on the second converted sensor data, and using the first coordinate and the second coordinate as a set of coordinate data;
   returning to the step of obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, wherein N is a positive integer not less than an amount of unknown degrees of freedom in an external parameter; and calculating the external parameter between the first sensor and the second sensor based on the N sets of the coordinate data, wherein the external parameter is a relative positional relationship parameter between the first sensor and the second sensor;

wherein the first sensor is a single-line radar, the second sensor is a visual sensor, and the step of obtaining the first sensor data and the second sensor data obtained through the first sensor and the second sensor of the robot by collecting the position information of the calibration reference object comprises:

obtaining visual sensor data obtained through the visual sensor by collecting the position information of the calibration reference object; and extracting corresponding row data from the visual sensor data to take as the second sensor data based on a measured height of the single-line radar, in response to a height of the single-line radar being within a measurement range of the vision sensor; and selecting data with a closest height from the visual sensor data to take as the second sensor data, in response to the height of the single-line radar not being within the measurement range of the vision sensor;

wherein the calculating the external parameter between the first sensor and the second sensor based on the N sets of the coordinate data, wherein the external parameter is the relative positional relationship parameter between the first sensor and the second sensor comprises:

obtaining a conversion relationship between positions of the first sensor and the second sensor; and calculating the relative positional relationship parameter between the first sensor and the second sensor based on the N sets of the coordinate data and the conversion relationship; and wherein the conversion relationship is represented by a parameter to be solved, a data set of the first sensor is $(x_i, y_i)$ and a data set of the second sensor is $(x_i', y_i')$, and for a 2D navigation application of the robot, the parameter to be solved is $(\Delta x, \Delta y, \Delta yaw)$, the conversion relationship is expressed as following matrix equation:

$$\begin{bmatrix} x_i \\ y_i \\ 1 \end{bmatrix} = \begin{bmatrix} \cos(\Delta yaw) & \sin(\Delta yaw) & \Delta x \\ -\sin(\Delta yaw) & \cos(\Delta yaw) & \Delta y \\ 0 & 0 & 1 \end{bmatrix} \begin{bmatrix} x_i' \\ y_i' \\ 1 \end{bmatrix};$$

the matrix equation is solved to obtain:

$$\begin{bmatrix} x_i \\ y_i \\ 1 \end{bmatrix} = \begin{bmatrix} x_i'\cos(\Delta yaw) + y_i'*\sin(\Delta yaw) + \Delta x \\ -x_i'\sin(\Delta yaw) + y_i'*\cos(\Delta yaw) + \Delta y \\ 1 \end{bmatrix};$$

the solved matrix equation is converted to obtain:

$$\begin{bmatrix} x_i \\ y_i \\ 1 \end{bmatrix} = \begin{bmatrix} x_i' & y_i' & 1 & 0 \\ y_i' & -x_i' & 0 & 1 \end{bmatrix} \begin{bmatrix} \cos(\Delta yaw) \\ \sin(\Delta yaw) \\ \Delta x \\ \Delta y \end{bmatrix};$$

the obtained matrix equation is described as a problem of solving a linear equation of $Ax=b$:

$$A = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4}; b = \begin{bmatrix} x_0 \\ y_0 \\ \vdots \\ x_n \\ y_n \end{bmatrix}_{2n*1};$$

and the following formula is obtained:

$$\begin{bmatrix} \cos(\Delta yaw) \\ \sin(\Delta yaw) \\ \Delta x \\ \Delta y \end{bmatrix} = \begin{bmatrix} x_0' & y_0' & 1 & 0 \\ y_0' & -x_0' & 0 & 1 \\ & \cdot & & \\ & \cdot & & \\ & \cdot & & \\ x_n' & y_n' & 1 & 0 \\ y_n' & -x_n' & 0 & 1 \end{bmatrix}_{2n*4}^{-1} \begin{bmatrix} x_0 \\ y_0 \\ \cdot \\ \cdot \\ \cdot \\ x_n \\ y_n \end{bmatrix}_{2n*1};$$

$$\Delta yaw = \arctan\left(\frac{\sin(\Delta yaw)}{\cos(\Delta yaw)}\right);$$

each value in the external parameter $(\Delta x, \Delta y, \Delta yaw)$ is solved, where n represents n sets of coordinate data.

2. The method of claim 1, wherein the reference point is a turning point of two associated sides of the calibration reference object; the determining the first coordinate of the reference point of the calibration reference object based on the first converted sensor data, and determining the second coordinate of the reference point of the calibration reference object based on the second converted sensor data comprises:

fitting the two associated sides with respect to the turning point of the collected calibration reference object based on the first converted sensor data, and determining the first coordinate of the turning point based on a result of the fitting; and fitting the two associated sides with respect to the turning point of the collected calibration reference object based on the second convened sensor data, and determining the second coordinate of the turning point based on a result of the fitting.

3. The method of claim 2, wherein the two associated sides with respect to the turning point of the calibration reference object are straight lines; the performing the fitting on the two associated sides with respect to the turning point of the collected calibration reference object based on the first converted sensor data, and determining the first coordinate of the turning point based on the result of the fitting comprises:

performing a straight line fitting on each of the two associated sides with respect to the turning point of the collected calibration reference object based on the first converted sensor data, and using a coordinate of an intersection point of two straight lines obtained by the fitting as the first coordinate of the turning point;

the performing the fitting on the two associated sides with respect to the turning point of the collected calibration reference object based on the second converted sensor data, and determining the second coordinate of the turning point based on the result of the fitting comprises:
performing a straight line fitting on each of the two associated sides with respect to the turning point of the collected calibration reference object based on the second convened sensor data, and using a coordinate of an intersection point of two straight lines obtained by the fitting as the second coordinate of the turning point.

4. The method of claim 1, wherein the converting the first sensor data and the second sensor data to the same coordinate system to obtain the corresponding first converted sensor data and the second converted sensor data comprises:
converting the first sensor data from a coordinate system of the first sensor to a coordinate system of the robot to obtain first converted sensor data; and
convening the second sensor data from a coordinate system of the second sensor to the coordinate system of the robot to obtain second converted sensor data.

5. The method of claim 1, wherein the calibration reference object is a triangular cylinder and the reference point is an apex of an included angle of the triangular cylinder.

6. An external parameter calibration apparatus for sensors of a robot, comprising:
an obtaining module configured to obtain first sensor data and second sensor data obtained through a first sensor and a second sensor of the robot by collecting position information of a calibration reference object;
a conversion module configured to convert the first sensor data and the second sensor data to a same coordinate system to obtain corresponding first converted sensor data and second converted sensor data;
a determination module configured to determine a first coordinate of a reference point of the calibration reference object based on the first converted sensor data, and determining a second coordinate of the reference point of the calibration reference object based on the second converted sensor data, and using the first coordinate and the second coordinate as a set of coordinate data;
a loop module configured to return to the obtaining the first sensor data and the second sensor data obtained through the first sensor and the second sensor of the robot by collecting the position information of the calibration reference object in response to a relative positional relationship between the robot and the calibration reference object being changed until N sets of the coordinate data are obtained, wherein N is a positive integer not less than an amount of unknown degrees of freedom in an external parameter; and
a calculation module configured to calculate the external parameter between the first sensor and the second sensor based on the N sets of the coordinate data, wherein the external parameter is a relative positional relationship parameter between the first sensor and the second sensor;
wherein the first sensor is a single-line radar, the second sensor is a visual sensor, and the obtaining module is further configured to:
obtain visual sensor data obtained through the visual sensor by collecting the position information of the calibration reference object; and
extract corresponding row data from the visual sensor data to take as the second sensor data based on a measured height of the single-line radar, in response to a height of the single-line radar being within a measurement range of the vision sensor; and
select data with a closest height from the visual sensor data to take as the second sensor data, in response to the height of the single-line radar not being within the measurement range of the vision sensor;
wherein the calculation module is further configured to:
obtain a conversion relationship between positions of the first sensor and the second sensor; and
calculate the relative positional relationship parameter between the first sensor and the second sensor based on the N sets of the coordinate data and the conversion relationship; and
wherein the conversion relationship is represented by a parameter to be solved, a data set of the first sensor is $(x_i, y_i)$ and a data set of the second sensor is $(x_i', y_i')$, and for a 2D navigation application of the robot, the parameter to be solved is $(\Delta x, \Delta y, \Delta yaw)$, the conversion relationship is expressed as following matrix equation;

$$\begin{bmatrix} x_i \\ y_i \\ 1 \end{bmatrix} = \begin{bmatrix} \cos(\Delta yaw) & \sin(\Delta yaw) & \Delta x \\ -\sin(\Delta yaw) & \cos(\Delta yaw) & \Delta y \\ 0 & 0 & 1 \end{bmatrix} \begin{bmatrix} x_i' \\ y_i' \\ 1 \end{bmatrix};$$

the matrix equation is solved to obtain;

$$\begin{bmatrix} x_i \\ y_i \\ 1 \end{bmatrix} = \begin{bmatrix} x_i'\cos(\Delta yaw) + y_i' * \sin(\Delta yaw) + \Delta x \\ -x_i'\sin(\Delta yaw) + y_i' * \cos(\Delta yaw) + \Delta y \\ 1 \end{bmatrix};$$

the solved matrix equation is converted to obtain;

$$\begin{bmatrix} x_i \\ y_i \\ 1 \end{bmatrix} = \begin{bmatrix} x_i' & y_i' & 1 & 0 \\ y_i' & -x_i' & 0 & 1 \end{bmatrix} \begin{bmatrix} \cos(\Delta yaw) \\ \sin(\Delta yaw) \\ \Delta x \\ \Delta y \end{bmatrix};$$

the obtained matrix equation is described as a problem of solving a linear equation of $Ax=b$;

$$A = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4}; b = \begin{bmatrix} x_0 \\ y_0 \\ \vdots \\ x_n \\ y_n \end{bmatrix}_{2n*1};$$

and
the following formula is obtained:

$$\begin{bmatrix} \cos(\Delta yaw) \\ \sin(\Delta yaw) \\ \Delta x \\ \Delta y \end{bmatrix} = \begin{bmatrix} x_0' & y_0' & 1 & 0 \\ y_0' & -x_0' & 0 & 1 \\ & \cdot & & \\ & \cdot & & \\ x_n' & y_n' & 1 & 0 \\ y_n' & -x_n' & 0 & 1 \end{bmatrix}_{2n*4}^{-1} \begin{bmatrix} x_0 \\ y_0 \\ \cdot \\ \cdot \\ x_n \\ y_n \end{bmatrix}_{2n*1};$$

-continued $$\Delta yaw = \arctan\left(\frac{\sin(\Delta yaw)}{\cos(\Delta yaw)}\right);$$

each value in the external parameter ($\Delta x$, $\Delta y$, $\Delta yaw$) is solved, where n represents a sets of coordinate data.

7. A robot comprising a non-transitory storage and a processor, wherein the non-transitory storage stores a computer program executable on the processor and the computer program comprises:
   instructions for obtaining first sensor data and second sensor data obtained through a first sensor and a second sensor of the robot by collecting position information of a calibration reference object;
   instructions for converting the first sensor data and the second sensor data to a same coordinate system to obtain corresponding first converted sensor data and second converted sensor data;
   instructions for determining a first coordinate of a reference point of the calibration reference object based on the first converted sensor data, and determining a second coordinate of the reference point of the calibration reference object based on the second converted sensor data, and using the first coordinate and the second coordinate as a set of coordinate data;
   instructions for returning to execute the instructions for obtaining the first sensor data and the second sensor data obtained through the first sensor and the second sensor of the robot by collecting the position information of the calibration reference object in response to a relative positional relationship between the robot and the calibration reference object being changed until N sets of the coordinate data re obtained, wherein N is a positive integer not less than an amount of unknown degrees of freedom in an external parameter; and
   instructions for calculating the external parameter between the first sensor and the second sensor based on the N sets of the coordinate data, wherein the external parameter is a relative positional relationship parameter between the first sensor and the second sensor;
   wherein the first sensor is a single-line radar, the second sensor is a visual sensor, and the instructions for obtaining the first sensor data and the second sensor data obtained through the first sensor and the second sensor of the robot by collecting the position information of the calibration reference object comprises:
      instructions for obtaining visual sensor data obtained through the visual sensor by collecting the position information of the calibration reference object; and
      instructions for extracting corresponding row data from the visual sensor data to take as the second sensor data based on a measured height of the single-line radar, in response to a height of the single-line radar being within a measurement range of the vision sensor; and
      instructions for selecting data with a closest height from the visual sensor data to take as the second sensor data, in response to the height of the single-line radar not being within the measurement range of the vision sensor;
   wherein the instructions for calculating the external parameter between the first sensor and the second sensor based on the N sets of the coordinate data, wherein the external parameter is the relative positional relationship parameter between the first sensor and the second sensor comprise:
      instructions for obtaining, a conversion relationship between positions of the first sensor and the second sensor; and
      instructions for calculating the relative positional relationship parameter between the first sensor and the second sensor based on the N sets of the coordinate data and the conversion relationship; and
   wherein the conversion relationship is represented by a parameter to: be solved a data set of the first sensor is $(x_i, y_i)$ and a data set of the second sensor is $(x_i', y_i')$, and for a 2D navigation application of the robot, the parameter to be solved is ($\Delta x$, $\Delta y$, $\Delta yaw$), the conversion relationship is expressed as following matrix equation:

$$\begin{bmatrix} x_i \\ y_i \\ 1 \end{bmatrix} = \begin{bmatrix} \cos(\Delta yaw) & \sin(\Delta yaw) & \Delta x \\ -\sin(\Delta yaw) & \cos(\Delta yaw) & \Delta y \\ 0 & 0 & 1 \end{bmatrix} \begin{bmatrix} x_i' \\ y_i' \\ 1 \end{bmatrix};$$

the matrix equation is solved to obtain;

$$\begin{bmatrix} x_i \\ y_i \\ 1 \end{bmatrix} = \begin{bmatrix} x_i'\cos(\Delta yaw) + y_i'*\sin(\Delta yaw) + \Delta x \\ -x_i'\sin(\Delta yaw) + y_i'*\cos(\Delta yaw) + \Delta y \\ 1 \end{bmatrix};$$

the solved matrix equation is converted to obtain;

$$\begin{bmatrix} x_i \\ y_i \\ 1 \end{bmatrix} = \begin{bmatrix} x_i' & y_i' & 1 & 0 \\ y_i' & -x_i' & 0 & 1 \end{bmatrix} \begin{bmatrix} \cos(\Delta yaw) \\ \sin(\Delta yaw) \\ \Delta x \\ \Delta y \end{bmatrix};$$

the obtained matrix equation is described as a problem of Solving a linear equation of $Ax=b$;

$$A = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4} ; b = \begin{bmatrix} x_0 \\ y_0 \\ \vdots \\ x_n \\ y_n \end{bmatrix}_{2n*1} ;$$

and
the following formula is obtained;

$$\begin{bmatrix} \cos(\Delta yaw) \\ \sin(\Delta yaw) \\ \Delta x \\ \Delta y \end{bmatrix} = \begin{bmatrix} x_0' & y_0' & 1 & 0 \\ y_0' & -x_0' & 0 & 1 \\ & \vdots & & \\ x_n' & y_n' & 1 & 0 \\ y_n' & -x_n' & 0 & 1 \end{bmatrix}_{2n*4}^{-1} \begin{bmatrix} x_0 \\ y_0 \\ \vdots \\ x_n \\ y_n \end{bmatrix}_{2n*1} ;$$

$$\Delta yaw = \arctan\left(\frac{\sin(\Delta yaw)}{\cos(\Delta yaw)}\right);$$

each value in the external parameter ($\Delta x$, $\Delta y$, $\Delta yaw$) is solved, where n represents n sets of coordinate data.

8. The robot of claim 7, wherein the reference point is a turning point of two associated sides of the calibration reference object; the instructions for determining the first coordinate of the reference point of the calibration reference object based on the first converted sensor data, and determining the second coordinate of the reference point of the calibration reference object based on the second converted sensor data comprise:

instructions for fitting the two associated sides with respect to the turning point of the collected calibration reference object based on the first converted sensor data, and determining the first coordinate of the turning point based on a result of the fitting; and instructions for fitting the two associated sides with respect to the turning point of the collected calibration reference object based on the second converted sensor data, and determining the second coordinate of the turning point based on a result of the fitting.

9. The robot of claim 7, wherein the two associated sides with respect to the turning point of the calibration reference object are straight lines; the instructions for performing the fitting on the two associated sides with respect to the turning point of the collected calibration reference object based on the first converted sensor data, and determining the first coordinate of the turning point based on the result of the fitting comprise:

instructions for performing a straight line fitting on each of the two associated sides with respect to the turning point of the collected calibration reference object based on the first converted sensor data, and using a coordinate of an intersection point of two straight lines obtained by the fitting as the first coordinate of the turning point;

the instructions for performing the fitting on the two associated sides with respect to the turning point of the collected calibration reference object based on the second converted sensor data, and determining the second coordinate of the turning point based on the result of the fitting comprise:

instructions for performing a straight line fitting on each of the two associated sides with respect to the turning point of the collected calibration reference object based on the second converted sensor data, and using a coordinate of an intersection point of two straight lines obtained by the fitting as the second coordinate of the turning point.

10. The robot of claim 7, wherein the instructions for converting the first sensor data and the second sensor data to the same coordinate system to obtain the corresponding first converted sensor data and the second convened sensor data comprise:

instructions for converting the first sensor data from a coordinate system of the first sensor to a coordinate system of the robot to obtain first convened sensor data; and instructions for converting the second sensor data from a coordinate system of the second sensor to the coordinate system of the robot to obtain second convened sensor data.

11. The robot of claim 7, wherein the calibration reference object is a triangular cylinder and the reference point is an apex of an included angle of the triangular cylinder.

12. The method of claim 1, wherein the external parameter is calculated using least squares.

13. The method of claim 1, wherein the relative positional relationship between the robot and the calibration reference object is changed by moving the calibration reference object.

14. The method of claim 5, wherein the calibration reference object is an isosceles triangle cylinder, and an angle of an isosceles included angle of the isosceles triangle cylinder is in a range of 90°-160°.

15. The method of claim 1, wherein a range of measuring distance is 0.3 m-2.0 m, a middle part of a vision field of the visual sensor is selected as an area range of the visual sensor.

16. The method of claim 1, wherein the step of converting the first sensor data and the second sensor data to the same coordinate system to obtain the corresponding first converted sensor data and the second converted sensor data comprises:

converting the first sensor data and the second sensor data uniformly to a coordinate system of the first sensor or a coordinate system of the second sensor.

17. The apparatus of claim 6, wherein the calculation module is further configured to:

obtain a conversion relationship between positions of the first sensor and the second sensor; and calculate the relative positional relationship parameter between the first sensor and the second sensor based on the N sets of the coordinate data and the conversion relationship.

* * * * *